United States Patent
Cooke et al.

(10) Patent No.: US 12,020,088 B2
(45) Date of Patent: *Jun. 25, 2024

(54) SYSTEM AND METHOD FOR MANAGING CONCURRENT EVENTS

(71) Applicant: Twilio Inc., San Francisco, CA (US)

(72) Inventors: Evan Cooke, San Francisco, CA (US); Frank Stratton, San Francisco, CA (US); Kyle Conroy, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,703

(22) Filed: Jun. 24, 2021

(65) Prior Publication Data
US 2021/0318917 A1    Oct. 14, 2021

Related U.S. Application Data

(63) Continuation of application No. 16/580,579, filed on Sep. 24, 2019, now Pat. No. 11,093,305, which is a (Continued)

(51) Int. Cl.
*G06F 9/46* (2006.01)
*G06F 9/50* (2006.01)
*G06F 9/54* (2006.01)

(52) U.S. Cl.
CPC ............ *G06F 9/542* (2013.01); *G06F 9/5027* (2013.01); *G06F 2209/504* (2013.01); *Y02D 10/00* (2018.01)

(58) Field of Classification Search
CPC .. G06F 9/542; G06F 9/5027; G06F 2209/504; Y02D 10/00
See application file for complete search history.

(56) References Cited

U.S. PATENT DOCUMENTS 5,274,700 A    12/1993  Gechter et al.
5,526,416 A     6/1996  Dezonno et al.
(Continued)

FOREIGN PATENT DOCUMENTS

DE    1684587 A1    3/1971
EP    0282126 A2    9/1988
(Continued)

OTHER PUBLICATIONS

"Aepona's API Monetization Platform Wins Best of 4G Awards for Mobile Cloud Enabler", 4G World 2012 Conference & Expo, [Online]. [Accessed Nov. 5, 2015]. Retrieved from the Internet: <URL: https://www.realwire.com/releases/%20Aeponas-API-Monetization>, (Oct. 30, 2012), 4 pgs.
(Continued)

*Primary Examiner* — Diem K Cao
(74) *Attorney, Agent, or Firm* — Schwegman Lundberg & Woessner, P.A.

(57) ABSTRACT

A system and method that includes receiving an API request to a type of API resource; retrieving an API concurrency value for the API request; determining a comparison status associated with a comparison of the API concurrency value to a concurrency threshold; if the comparison status is within the concurrency threshold, transmitting the API request to an API processing resource; if the comparison status indicates the concurrency threshold is not satisfied, impeding processing of the API request; accounting for an increase in the API concurrency value if the API request is transmitted to an API processing resource; and accounting for a decrease in the API concurrency value at a time associated with the API processing resource completing processing of the API request.

20 Claims, 11 Drawing Sheets

Related U.S. Application Data continuation of application No. 15/291,386, filed on Oct. 12, 2016, now Pat. No. 10,467,064, which is a continuation of application No. 13/764,594, filed on Feb. 11, 2013, now Pat. No. 9,495,227.

(60) Provisional application No. 61/597,239, filed on Feb. 10, 2012.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh et al. |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Strom et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| D540,074 S | 4/2007 | Peters |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |

(56) References Cited

U.S. PATENT DOCUMENTS

| | | |
|---|---|---|
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soderstrom et al. |
| 8,103,725 B2 | 1/2012 | Gupta et al. |
| 8,126,128 B1 | 2/2012 | Hicks, III et al. |
| 8,126,129 B1 | 2/2012 | Mcguire |
| 8,130,750 B2 | 3/2012 | Hester |
| 8,130,917 B2 | 3/2012 | Helbling et al. |
| 8,139,730 B2 | 3/2012 | Da Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,230,107 B2 | 7/2012 | Tantawi et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | Mckeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,681,630 B1 * | 3/2014 | Gibson ............... H04L 67/62 370/235 |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |
| 8,781,975 B2 | 7/2014 | Bennett et al. |
| 8,797,920 B2 | 8/2014 | Parreira |
| 8,806,024 B1 | 8/2014 | Toba Francis et al. |
| 8,819,133 B2 | 8/2014 | Wang |
| 8,825,746 B2 | 9/2014 | Ravichandran et al. |
| 8,832,286 B2 | 9/2014 | Purpura |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |

(56) References Cited

U.S. PATENT DOCUMENTS

| | | |
|---|---|---|
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,953,453 B1 | 2/2015 | Xiao et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,495,227 B2 | 11/2016 | Cooke et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 10,467,064 B2 | 11/2019 | Cooke et al. |
| 11,093,305 B2 | 8/2021 | Cooke et al. |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong et al. |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat et al. |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Da Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matenda et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler, Jr. |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishler |
| 2005/0091336 A1 | 4/2005 | Dehamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslavsky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |
| 2006/0203979 A1 | 9/2006 | Jennings |
| 2006/0209695 A1 | 9/2006 | Archer, Jr. et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |

(56) References Cited

U.S. PATENT DOCUMENTS

| | | |
|---|---|---|
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Schwartz et al. |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Hertel et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0195521 A1 | 8/2010 | Wanstedt et al. |
| 2010/0208881 A1 | 8/2010 | Kawamura |
| 2010/0217837 A1 | 8/2010 | Ansari et al. |
| 2010/0217982 A1 | 8/2010 | Brown et al. |
| 2010/0229218 A1* | 9/2010 | Kumbalimutt ........ G06F 9/5005 726/4 |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |

(56) References Cited

U.S. PATENT DOCUMENTS

| | | |
|---|---|---|
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Hertel et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2011/0320620 A1 | 12/2011 | Cutler et al. |
| 2012/0000903 A1 | 1/2012 | Baarman et al. |
| 2012/0011274 A1 | 1/2012 | Moreman |
| 2012/0011521 A1 | 1/2012 | Knoodle |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | Vanswol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton et al. |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook et al. |
| 2013/0036476 A1 | 2/2013 | Roever et al. |
| 2013/0047232 A1 | 2/2013 | Tuchman et al. |
| 2013/0054517 A1 | 2/2013 | Beechuk et al. |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0091241 A1 | 4/2013 | Goetz et al. |
| 2013/0097298 A1 | 4/2013 | Ting et al. |
| 2013/0110658 A1 | 5/2013 | Lyman |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0290656 A1 | 10/2013 | Staelin et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |
| 2015/0004932 A1 | 1/2015 | Kim et al. |
| 2015/0004933 A1 | 1/2015 | Kim et al. |
| 2015/0023251 A1 | 1/2015 | Giakoumelis et al. |

(56) References Cited

U.S. PATENT DOCUMENTS

| | | |
|---|---|---|
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0031736 A1 | 2/2017 | Cooke et al. |
| 2017/0339283 A1 | 11/2017 | Chaudhary et al. |
| 2020/0050501 A1 | 2/2020 | Cooke et al. |

FOREIGN PATENT DOCUMENTS

| | | | |
|---|---|---|---|
| EP | 1464418 A1 | | 10/2004 |
| EP | 1522922 A2 | | 4/2005 |
| EP | 1770586 A1 | | 4/2007 |
| EP | 2053869 A1 | | 4/2009 |
| ES | 2134107 A1 | | 9/1999 |
| JP | 10294788 A | | 11/1998 |
| JP | 2004166000 A | | 6/2004 |
| JP | 2004220118 A | | 8/2004 |
| JP | 2006319914 A | | 11/2006 |
| WO | WO-9732448 A1 | | 9/1997 |
| WO | WO-2002087804 A1 | | 11/2002 |
| WO | WO-2006037492 A1 | | 4/2006 |
| WO | WO-2009018489 A2 | | 2/2009 |
| WO | WO-2009124223 A1 | | 10/2009 |
| WO | WO-2010037064 A1 | | 4/2010 |
| WO | WO-2010040010 A1 | | 4/2010 |
| WO | WO-2010101935 A1 | | 9/2010 |
| WO | WO-2011091085 A1 | | 7/2011 |

OTHER PUBLICATIONS

"U.S. Appl. No. 13/764,594, Examiner Interview Summary dated Jun. 3, 2016", 3 pgs.
"U.S. Appl. No. 13/764,594, Examiner Interview Summary dated Dec. 18, 2015", 3 pgs.
"U.S. Appl. No. 13/764,594, Final Office Action dated Sep. 28, 2015", 17 pgs.
"U.S. Appl. No. 13/764,594, Non Final Office Action dated Feb. 6, 2015", 16 pgs.
"U.S. Appl. No. 13/764,594, Non Final Office Action dated Feb. 16, 2016", 5 pgs.
"U.S. Appl. No. 13/764,594, Notice of Allowance dated Aug. 9, 2016", 10 pgs.
"U.S. Appl. No. 13/764,594, Response filed May 16, 2016 to Non Final Office Action dated Feb. 16, 2016", 11 pgs.
"U.S. Appl. No. 13/764,594, Response filed Jul. 28, 2015 to Non Final Office Action dated Feb. 6, 2015", 13 pgs.
"U.S. Appl. No. 13/764,594, Response filed Dec. 16, 2015 to Final Office Action dated Sep. 28, 2015", 12 pgs.
"U.S. Appl. No. 15/291,386, Examiner Interview Summary dated May 7, 2019", 3 pgs.
"U.S. Appl. No. 15/291,386, Final Office Action dated Jan. 11, 2019", 13 pgs.
"U.S. Appl. No. 15/291,386, Non Final Office Action dated Jun. 28, 2018", 15 pgs.
"U.S. Appl. No. 15/291,386, Notice of Allowance dated Jun. 24, 2019", 8 pgs.
"U.S. Appl. No. 15/291,386, Response filed Sep. 25, 2018 to Non Final Office Action dated Jun. 28, 2018", 11 pgs.
"U.S. Appl. No. 15/291,386, Response filed May 3, 2019 to Final Office Action dated Jan. 11, 2019", 12 pgs.
"U.S. Appl. No. 16/580,579, Non Final Office Action dated Oct. 6, 2020", 16 pgs.
"U.S. Appl. No. 16/580,579, Notice of Allowance dated Apr. 12, 2021", 8 pgs.
"U.S. Appl. No. 16/580,579, Response filed Feb. 4, 2021 to Non Final Office Action dated Oct. 6, 2020", 14 pgs.
"Archive Microsoft Office 365 Email I Retain Unified Archiving", GWAVA, Inc., Montreal, Canada, [Online] Retrieved from the Internet: <URL: http://www.gwava.com/Retain/Retain for_Office_365.php>, (2015), 4 pgs.
"Complaint for Patent Infringement", *Telinit Technologies, LLC* v. *Twilio Inc* 2:12-cv-663, (Oct. 12, 2012), 17 pgs.
"Ethernet to Token Ring Bridge", Black Box Corporation, [Online] Retrieved from the Internet: <URL: http://blackboxcanada.com/resource/files/productdetails/17044.pdf>, (Oct. 1999), 2 pgs.
"Twilio Cloud Communications—APIs for Voice, VoIP, and Text Messaging", Twilio, [Online] Retrieved from the Internet: <URL: http://www.twilio.com/docs/api/rest/call-feedback>, (Jun. 24, 2015), 8 pgs.
Abu-Lebdeh, et al., "A 3GPP Evolved Packet Core-Based Architecture for QoS-Enabled Mobile Video Surveillance Applications", 2012 Third International Conference on the Network of the Future {NOF), (Nov. 21-23, 2012), 1-6.
Barakovic, Sabina, et al., "Survey and Challenges of QoE Management Issues in Wireless Networks", Hindawi Publishing Corporation, (2012), 1-29.
Berners-Lee, T., "RFC 3986: Uniform Resource Identifier (URI): Generic Syntax", The Internet Society, [Online]. Retrieved from the Internet: <URL: http://tools.ietf.org/html/rfc3986>, (Jan. 2005), 57 pgs.
Bustamante, Michele Leroux, "Concurrency and Throttling Configurations for WCF Services", Dev Pro, (2009), 9 pgs.
Kim, Hwa-Jong, et al., "In-Service Feedback QoE Framework", 2010 Third International Conference on Communication Theory. Reliability and Quality of Service, (2010), 135-138.
Matos, et al., "Quality of Experience-based Routing in Multi-Service Wireless Mesh Networks", Realizing Advanced Video Optimized Wireless Networks. IEEE, (2012), 7060-7065.
Mu, Mu, et al., "Quality Evaluation in Peer-to-Peer IPTV Services", Data Traffic and Monitoring Analysis, LNCS 7754, 302-319, (2013), 18 pgs.
Subramanya, et al., "Digital Signatures", IEEE Potentials, (Mar./Apr. 2006), 5-8.
Tran, et al., "User to User adaptive routing based on QoE", ICNS 2011: The Seventh International Conference on Networking and Services, (2011), 170-177.
U.S. Appl. No. 13/764,594 U.S. Pat. No. 9,495,227, filed Feb. 11, 2013, System and Method for Managing Concurrent Events.
U.S. Appl. No. 15/291,386 U.S. Pat. No. 10,467,064, filed Oct. 12, 2016, System and Method for Managing Concurrent Events.
U.S. Appl. No. 16/580,579, filed Sep. 24, 2019, System and Method for Managing Concurrent Events.

\* cited by examiner

SYSTEM AND METHOD FOR MANAGING CONCURRENT EVENTS

CROSS-REFERENCE TO RELATED APPLICATIONS

This application is a continuation of U.S. application Ser. No. 16/580,579, filed 24 Sep. 2019, which is a continuation of U.S. application Ser. No. 15/291,386, filed 12 Oct. 2016, which is a continuation of U.S. application Ser. No. 13/764,594, filed 11 Feb. 2013 which claims the benefit of U.S. Provisional Application Ser. No. 61/597,239, filed on 10 Feb. 2012, all of which are incorporated in their entireties by reference.

TECHNICAL FIELD

This invention relates generally to the telephony field, and more specifically to a new and useful system and method for managing concurrent events in the telephony field.

BACKGROUND

In recent years, Innovations in the web application and Voice over Internet Protocol (VOIP) have brought about considerable changes to the capabilities offered through traditional phone services. New services and platforms have been introduced that integrate telephone voice conversations with website interaction, which has required an increase in the amount of data being transmitted between various servers and applications. Likewise, along with the increase in data traffic there is an increase in the data available to system users and developers. Where traditional telecommunications modalities might have made this data available sporadically, only via paper transactions, and/or for additional fees, users and developers in cloud-based communications expect to have access to large data amounts at their fingertips. Unfortunately, certain types of data transmissions have a tendency to crowd out and/or slow down the actual communications pipelines in the system, thus lessening the value of the system and the user/developer experience. In particular, large amounts of concurrent requests from users/developers can impede data traffic and/or communications between servers and applications. Thus, there is a need in the telephony field to create a new and useful system and method for managing concurrent events. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Managing Concurrent Events

Figure 1:
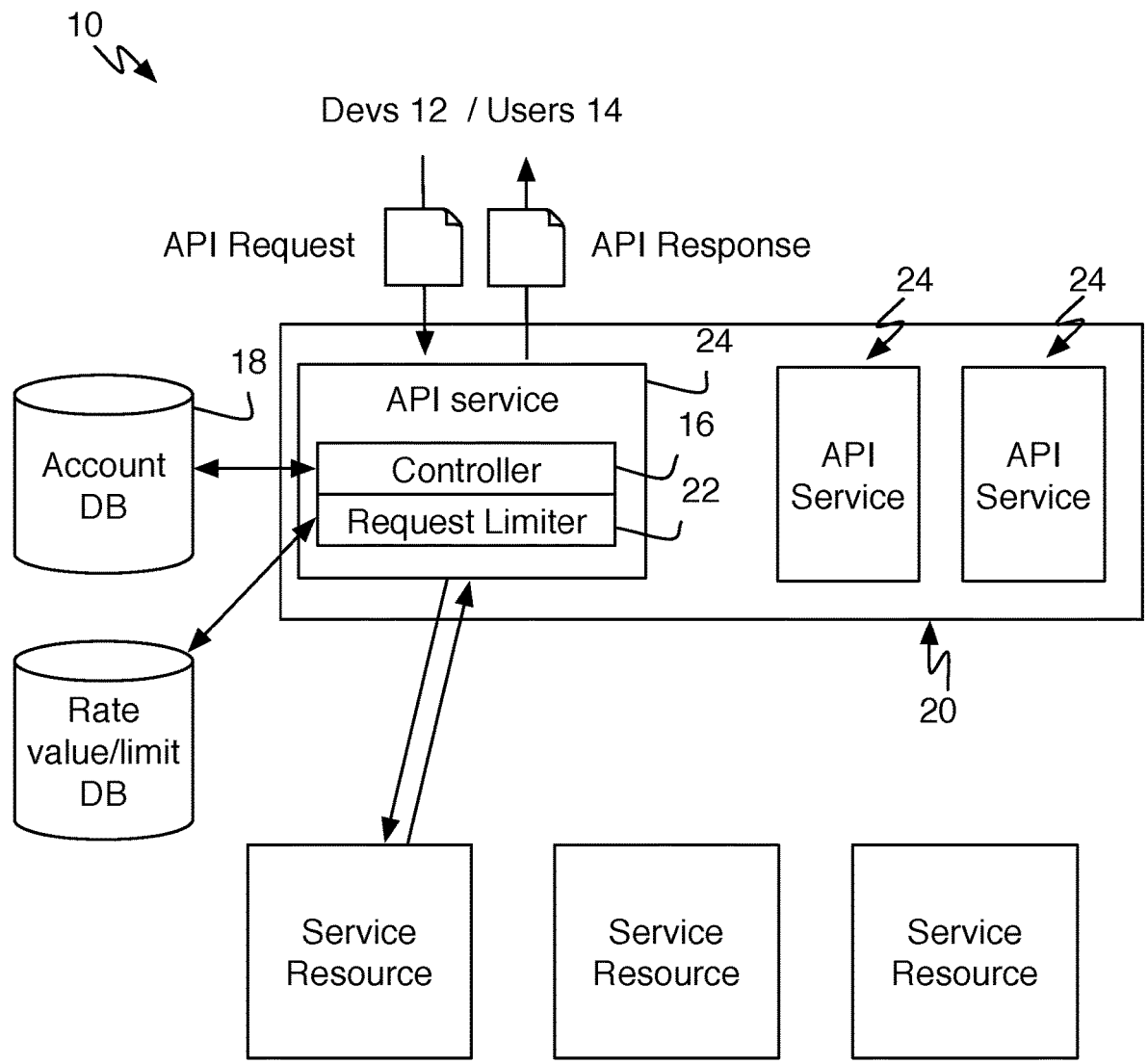
FIG. 1 is a schematic representation of a system of a preferred embodiment.

As shown in FIG. 1, a system 10 of the preferred embodiment can include a controller 16, an account database 18, and an application programming interface (API) cluster 20. The preferred system 10 can further accommodate developers 12 and users 14, all of whom can interact though the API cluster 20 in performing one or more tasks or functions within a cloud-based telephony platform of the type described in issued U.S. Pat. No. 8,306,021, application Ser. No. 12/417,630, filed on 2 Apr. 2009, and entitled "System and Method for Processing Telephony Sessions," which is incorporated herein in its entirety by this reference. The system 10 preferably functions to monitor, partition, allocate, distribute, and/or manage the use of dedicated API resources within the API cluster 20 in order to ensure an efficient and desirable experience for developers 12 and users 14. The system may be particularly configured to monitor and regulate API resource requests based on the account associated with the request and/or based on the resource type/categorization. In such configuration, the system may function to prevent excessive requests of one account from aversely impacting the requests of another account, and similarly the system may additionally or alternatively function to prevent requests to one resource type from adversely impacting requests to another resource type. The system is preferably implemented for request concurrency monitoring and regulation, but the system may alternatively be employed for other suitable request rate monitoring or regulation such as request initiation rate (e.g., requests per second/minute/hour/day), conclusion rate, simultaneous/bulk request rate, or any suitable rate. Preferably, the system 10 performs these functions in real time or near real time such that API resources are optimized by the demands requested of each user account.

As shown in FIG. 1, the preferred system 10 can include a controller 16 connected to the account database 18 and the API cluster 20. The controller 16 preferably functions to manage all interactions between the account database 18 and the API cluster 20. Preferably, the controller 16 can organize, sort, maintain, gather, and/or distribute data records for accounts holders in the account database 18 including any concurrency limits associated with an account. Preferably, each account includes a rate limit (e.g., a concurrency limit), which can be individualized or customized for each account based upon user request, user history, user demand, or any other suitable metric. Alternatively, each account can include a default rate limit established upon entry into the system 10, wherein the default rate limit can be altered or adjusted based on any suitable metric noted above. Alternatively, the rate values and/or rate limits may be stored in alternative databases or stored in any suitable manner. In one variation, there is a rate value database and a rate limit database. The rate value may store calculated values, which can be updated at anytime. Alternatively, the rate value database may be used for tracking API requests. For example, the rate value database or any suitable database may store a log of requests. When used to measure concurrency, a record is preferably created to account for the initiation of the processing of the request (e.g., when the request is delivered to a service resource). Additionally, the record is preferably removed or marked as ended when the request has completed (e.g., after a service resource has finished processing or after/when an API response is sent).

In a preferred mode of operation, each account makes a request (e.g., an http request) in using the system 10. The requests can be time stamped, cataloged, categorized, and/or otherwise captured by the request limiter 22 as described below. Preferably, each actual request made by each account is tracked by an API service 24, the request limiter 22 and/or the controller 16 in order to ascertain the API resource allocation on a per account basis for any suitable time period, including instantaneous or substantially instantaneous snapshots of the resource consumption in the API cluster 20. Alternatively or additionally, each account can have a maximum rate value as well as a current rate value recorded and stored at predetermined intervals such that during each interval, the greatest concurrent users of the API resources can be determined and managed. Preferably, the current rate value is compared with the maximum rate value for each account during the predetermined interval, i.e., in a two-entry dataset including a current value and a max value. Alternatively, the request limiter 22 can be configured to keep a running of an explicit count of requests for each user, which can either be maintained indefinitely or reset at predetermined intervals as described herein. In response to an account exceeding its rate value in the predetermined value, the preferred request limiter 22 adjusts or alters the API resources dedicated to the user account as described below. The preferred predetermined interval can include any suitable interval, either static or dynamic in nature. In one example configuration of the system 10, the predetermined interval is approximately six seconds, such that the monitoring of API resource requests and/or usage is substantially instantaneous and historical resource usage by a user account does not prejudice its current resource allocation.

Figure 2:
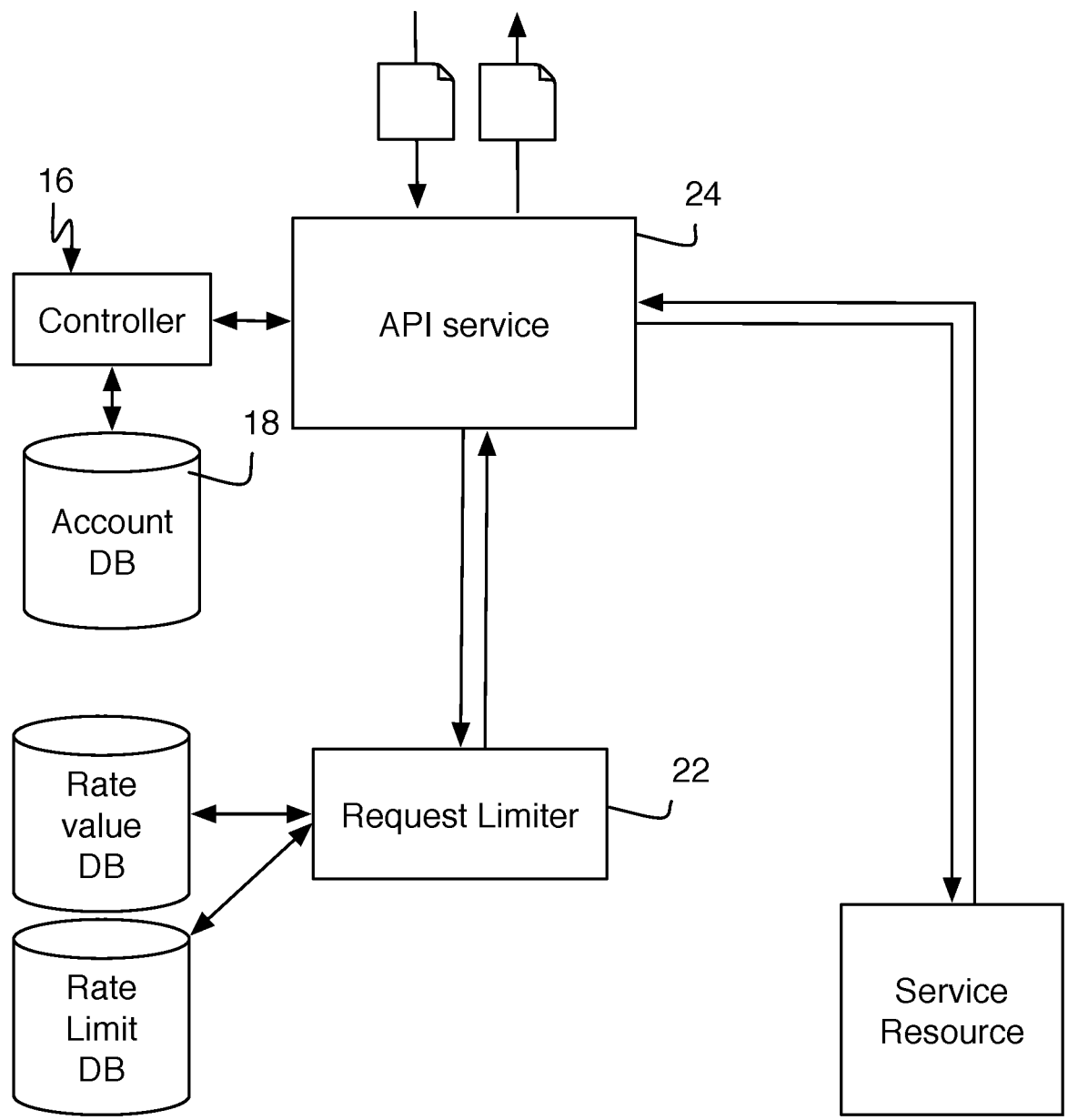
FIG. 2 is a detailed schematic representation of an alternative embodiment of a system of a preferred embodiment.

As shown in FIG. 1, the API cluster 20 can include a plurality of API services 24 connected and/or operatively coupled to the request limiter 22. Preferably, the each API service 24 can include its own request limiter 22 service located and/or operating locally on the respective API service 24. Alternatively, a single request limiter 22 or distinct request limiter 22 can function to serve a group or plurality of API services 24 within the API cluster 20 as shown in FIG. 2. An API service 24 may be configured for performing a series of processes that may include receiving a request, determining if the account has permissions to perform the request, checking the rate value against a rate limit, optionally transmitting the request to an appropriate service resource, responding to the request and/or any other suitable process. Preferably, the request limiter 22 functions with each API service 24 to monitor and/or adjust the consumption of API resources by large accounts. In a telephony platform of the type incorporated by reference above, only certain types of requests of the servers will take a substantial amount of time and thus impact the relative usage of concurrent API resources. For example, if a user makes a request for call records or other large data sets, the API service 24 must dedicate a significant amount of resources to handle the data traffic. As such, the preferred request limiter 22 can be configured to alert the API service 24 to any burdensome usage so that the API service 24 can transition traffic of the high-usage accounts into less crowded (and perhaps slower) data channels, as the resources allocated to those accounts is both data intensive and not particularly time sensitive as compared to the normal operations of the telephony platform. Additionally or alternatively, in response to excessive concurrent usage of the API by an account, the request limiter 22 and/or API service 24 can be further configured to transmit an error message to the account, slow down requests from the account to the API, and/or send other notifications and/or alerts to the account to inform the user of the excess and any action that the user might take to remedy its consumption.

2. Method for Managing Concurrent Events

Figure 3:
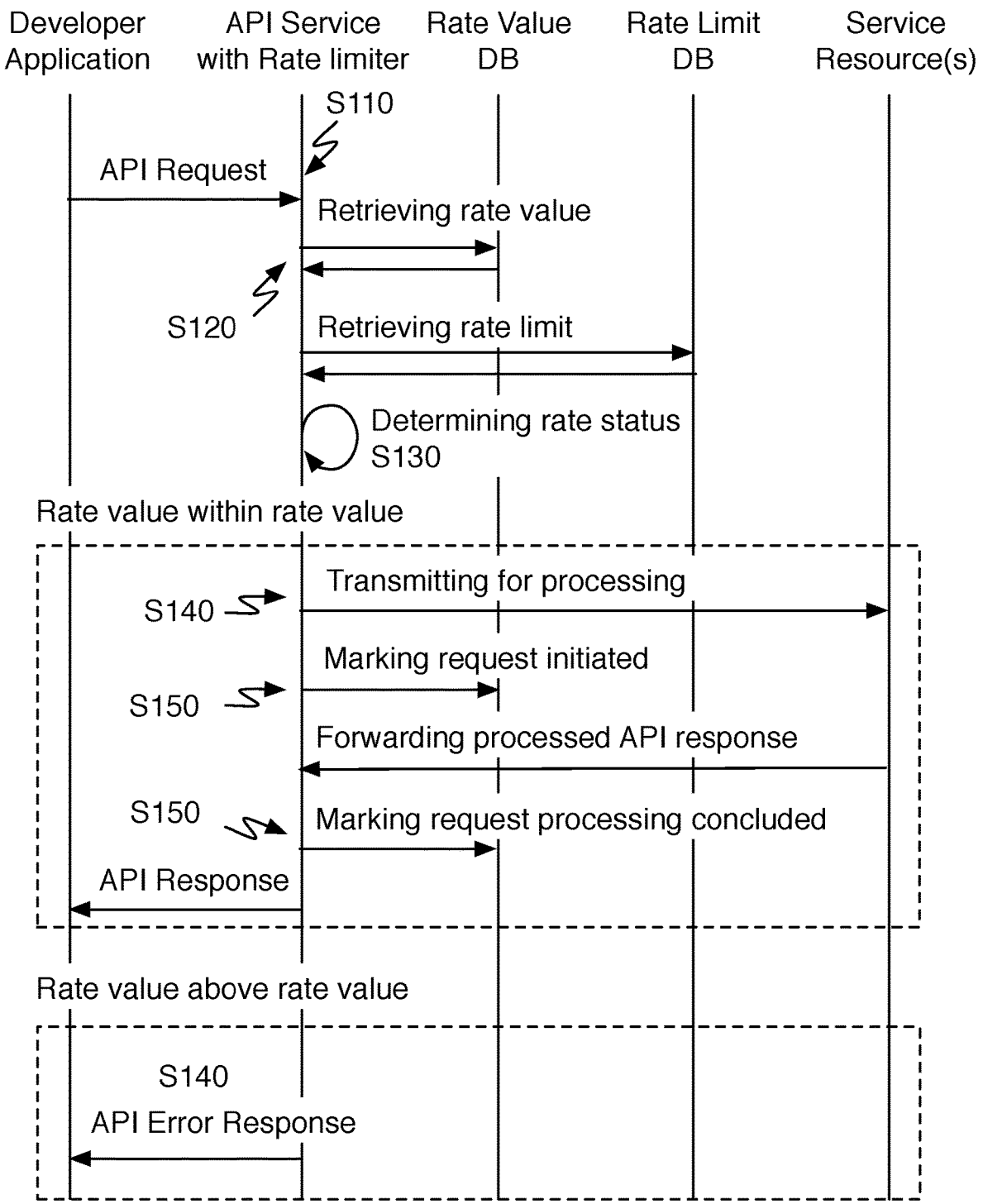
FIG. 3 is a communications schematic of a method of a preferred embodiment.

As shown in FIG. 3, a method of a preferred embodiment can include receiving API request S110, retrieving an API rate value S120, determining a comparison status associated with a comparison of the API concurrency value to a concurrency limit S130 processing a reaction to the API request according to the comparison status S140, and accounting for changes in the API usage rate S150. The method functions to monitor, partition, allocate, distribute, and/or manage the use of dedicated API resources and services. More preferably, the method functions to facilitate a multitenant ecosystem of a telephony platform such as the one incorporated by reference above. Preferably, the method performs these functions in real time or near real time such that API resources are monitored and regulated for each user account. As a first exemplary application of a method of a preferred embodiment, the method may be applied to balance the use of API resources between accounts. As a second exemplary application of a method of a preferred embodiment, the method may be applied to balance the use of specific API resources, such that one type of API request may be rate limited different from a second type of API request. For example, API REST requests directed at a "/SMS/Messages" resource type may be rate limited independently from API REST requests directed at a "/Calls" resource type. The method is preferably used in rate limiting based on request concurrency—requests that are actively serviced, processed, handled and/or in progress. Aligning the API request rate with API concurrency rate preferably accounts for variable, extended, or otherwise challenging API request latency issues. Herein, the method may be described as being applied to API concurrency rates, but the method may alternatively or additionally be used in rate limiting based on request initiation rate (e.g., requests per second/minute/hour/day), conclusion rate, simultaneous/bulk request rate, or any suitable activity rate.

Figure 4:
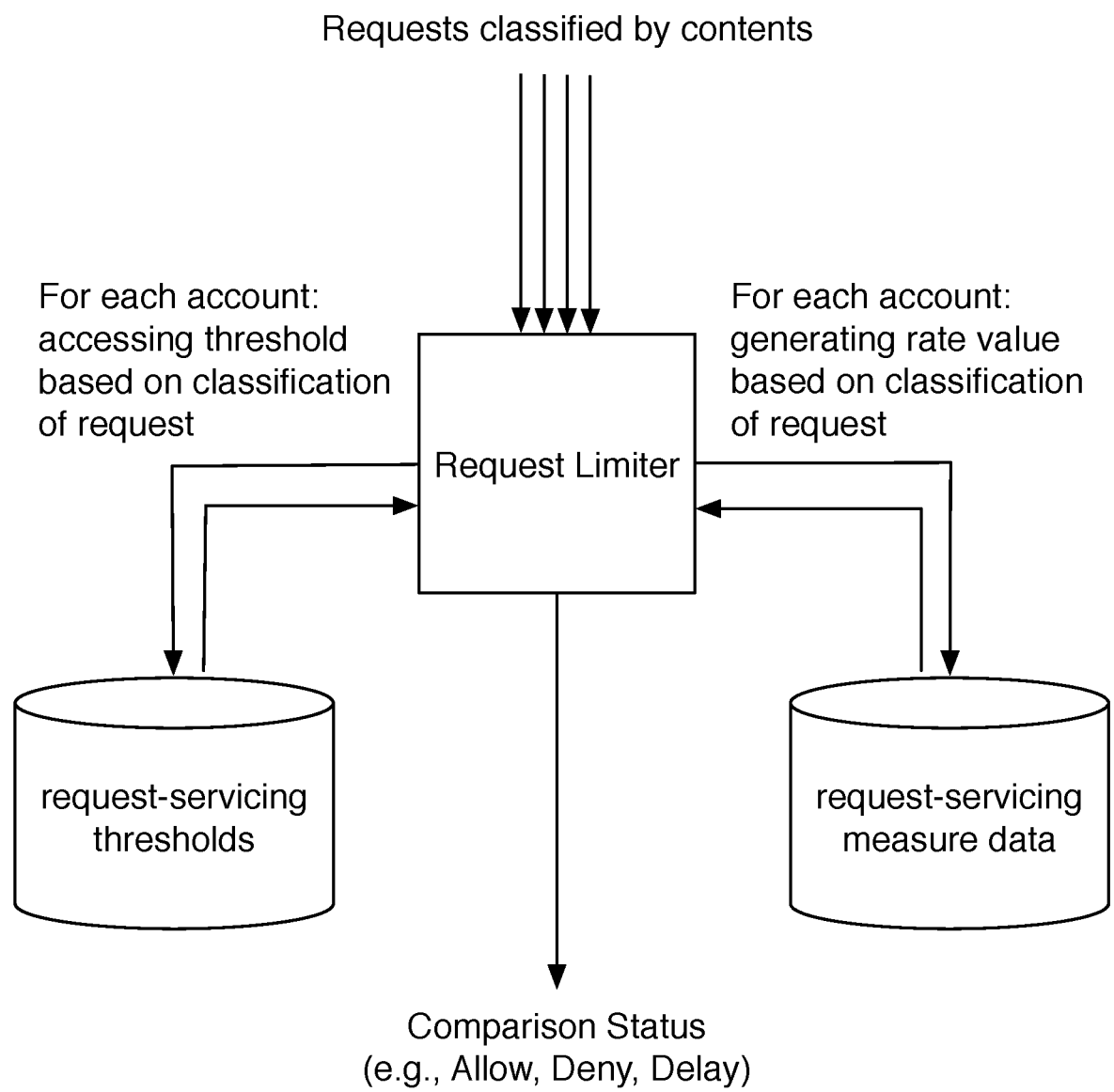
FIG. 4 is a schematic representation of a method for rate limiting requests of a preferred embodiment.

Step S110, which includes receiving an API request, functions to receive account activity relating to API resource usage. Receiving an API request preferably includes recording, recognizing, and/or receiving activity associated with each account (e.g., user or developer) associated with the telephony platform. The API request is preferably received at an API service or server. API requests initiated by a user account, application or other source are preferably routed through the API platform to the API service. A plurality of API services or servers preferably work in parallel and/or in cooperation to service a plurality of requests. Each API request is preferably processed by a request limiter and then, based on the results of the rate monitoring process, the API request can be processed by appropriate services, rejected, delayed or handled in any suitable manner as shown in FIG. 4. Example account activity can include requests (such as http requests, data requests, session requests, application requests and the like) made by a user account of the API. Preferably, account activity can include at least any type of account action or request that utilizes API resources within the telephony platform. Preferably, account activity can include a number of requests made relative to a maximum number of requests available to the account. The maximum request value can be customized for each account or set to a default value or any suitable combination thereof. As noted above, preferably each account can have a maximum concurrency value as well as a current concurrency value recorded and stored at predetermined intervals such that during each interval, the greatest concurrent users of the API resources can be determined and managed. The API request is preferably composed of content that may include headers, authentication section, and/or a body. The various parts of the request contents may specify IP addresses, authentication parameters, URI's, API instructions, data, parameters, and/or any suitable content type. The contents of the API request are preferably inspected and at least a sub-set of the contents may be used to classify the API request. The classification of an API request may be used in retrieving/generating rate values and limits associated with API requests of that type or classification. For example, API requests are preferably classified by the account making the request. The authentication parameters (e.g., an account secure identifier and an auth token) may be used to uniquely determine rate values and/or rate limits. As described herein the requests may alternatively be classified by the request/resource type, combinations of request content parameters, or any suitable aspect.

In one implementation of a preferred embodiment, the API service routes the API request to a request limiter. Alternatively, operation of the request limiter may be integrated into the API request processing of an API server or service. As noted above, a preferred configuration of the system can include multiple API services each served by a single request limiter. Alternatively, each API service can have its own local request limiter, in which case sending a request from the API to the request limiter can include a local intra-API request, notification or process flow.

The API requests preferably specify an API resource. The API resource preferably relates to an API resource type, category, class, or sub-class. API requests of a similar API resource type can have similar patterns in platform resource usage, latency, and other processing factors. The API requests additionally specify or are uniquely associated with an account and/or sub-account. Preferably, the API request can include an account number, name, or identifier of the account (or sub-account) seeking the API resources. The request can include any other suitable identifying information such as a time stamp of the account request(s) for more precisely identifying each individual request of each account. The preferred request of block S102 can include any other suitable information (API identification and available API resources, for example) usable by a request limiter in performing its functions.

Figure 5:
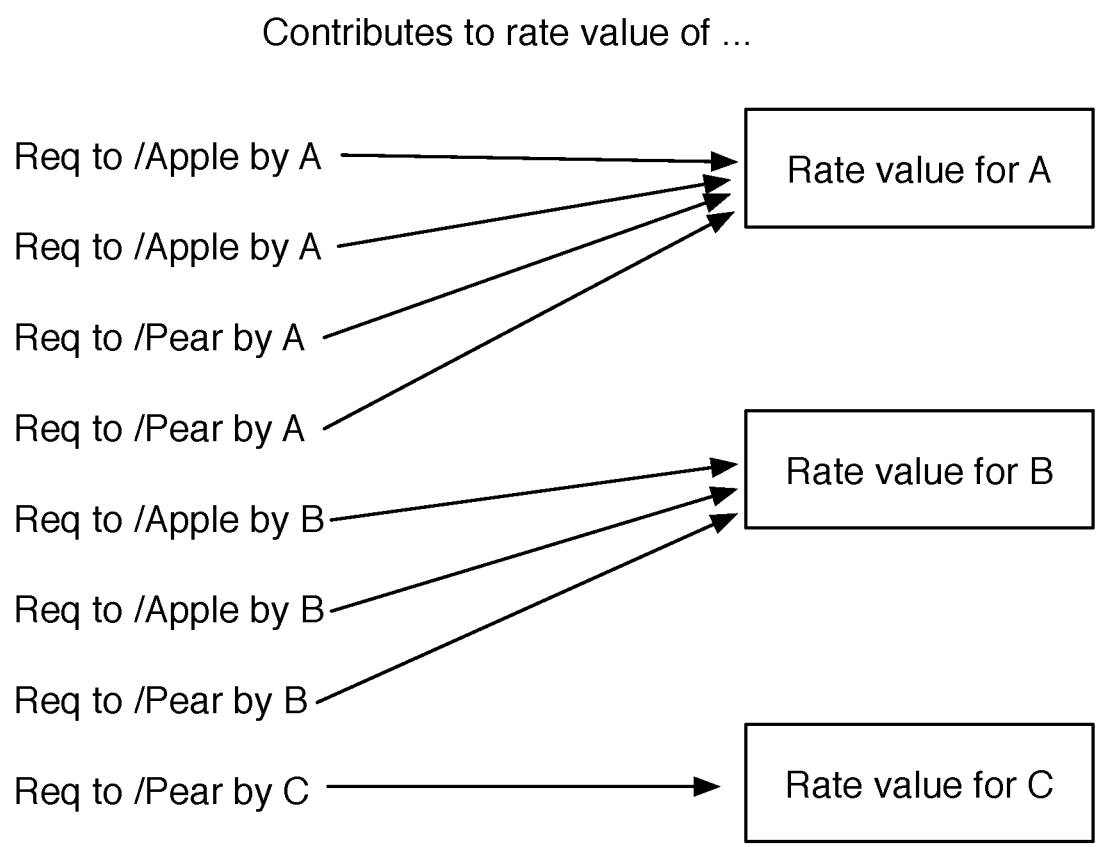
FIG. 5 is an exemplary schematic representation of monitoring and regulating requests by accounts.
Figure 6:
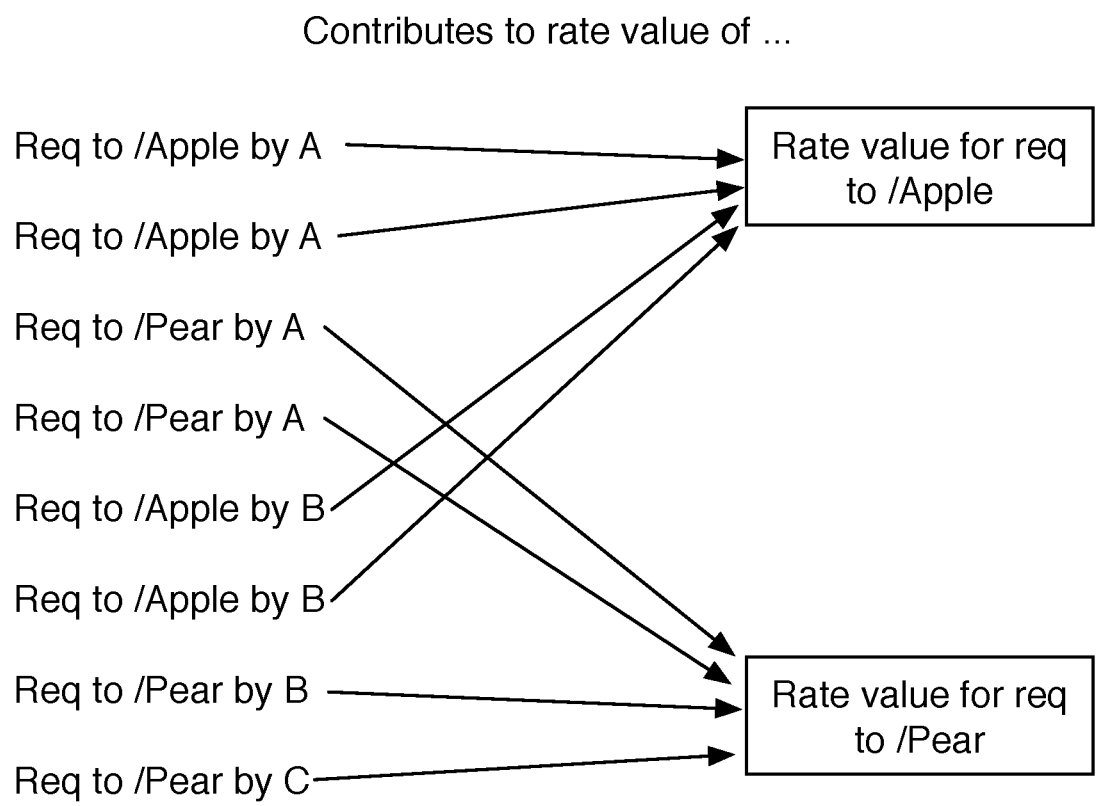
FIG. 6 is an exemplary schematic representation of monitoring and regulating requests by API resource type.
Figure 7:
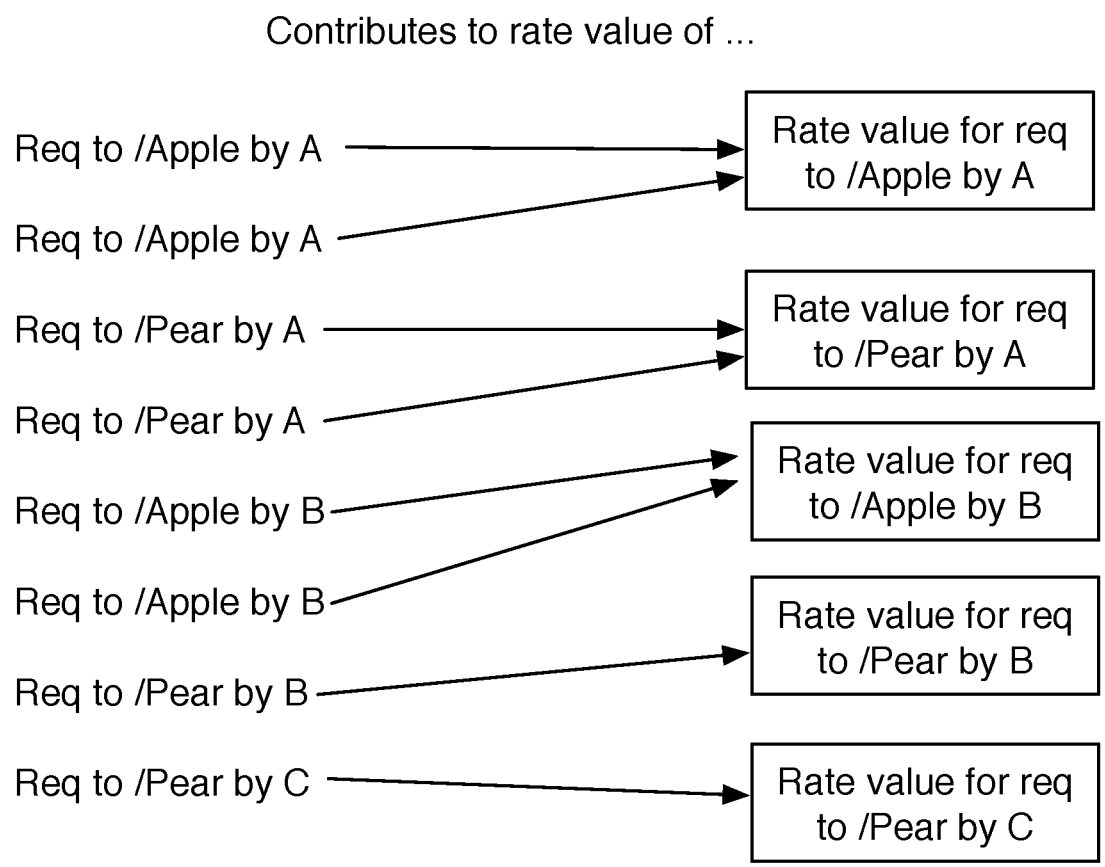
FIG. 7 is an exemplary schematic representation of monitoring and regulating requests based on API resource type and account.

Step S120, which includes retrieving an API rate value, functions to compare, calculate, compute, access, generate, and/or check a rate value. The rate value may function as a request-servicing measure of the current status/state of processing requests. The API rate value is preferably a concurrency value, but may alternatively be any suitable rate value. In a first variation, the concurrency value is preferably a concurrency value for the account associated with the API request. As shown in FIG. 5, requests may then be segmented, monitored and regulated based on the accounts to which the requests belong. Similarly, the concurrency value may be for sub-account, for specific endpoints of an account or sub-account (e.g., phone number, short code, SIP address, and the like), or request properties (e.g., location, carrier, modality, etc). In another variation, the concurrency value can be a concurrency value for API requests of a particular API resource type or category. As shown in FIG. 6, requests may be segmented, monitored, and regulated based on the resource type, categorization, or request parameters. The API rate value may alternatively be assigned to a specific account for a particular API resource type or category. As shown in FIG. 7, requests may be segmented, monitored and regulated based on resource type and associated account. For example, an account rate is preferably maintained independently for API requests to "/Calls" resources made by Account A, to "/SMS/Messages" resources made by Account A, and to "/Calls" resources made by Account B. Alternatively, the concurrency value may be global or multi-account rate value. The rate value may have any suitable resolution and segmentation for request monitoring. The rate value may additionally or alternatively relate/reflect a request initiation rate (e.g., requests per second/minute/hour/day), conclusion rate, simultaneous/bulk request rate, or any suitable rate.

Figure 8:
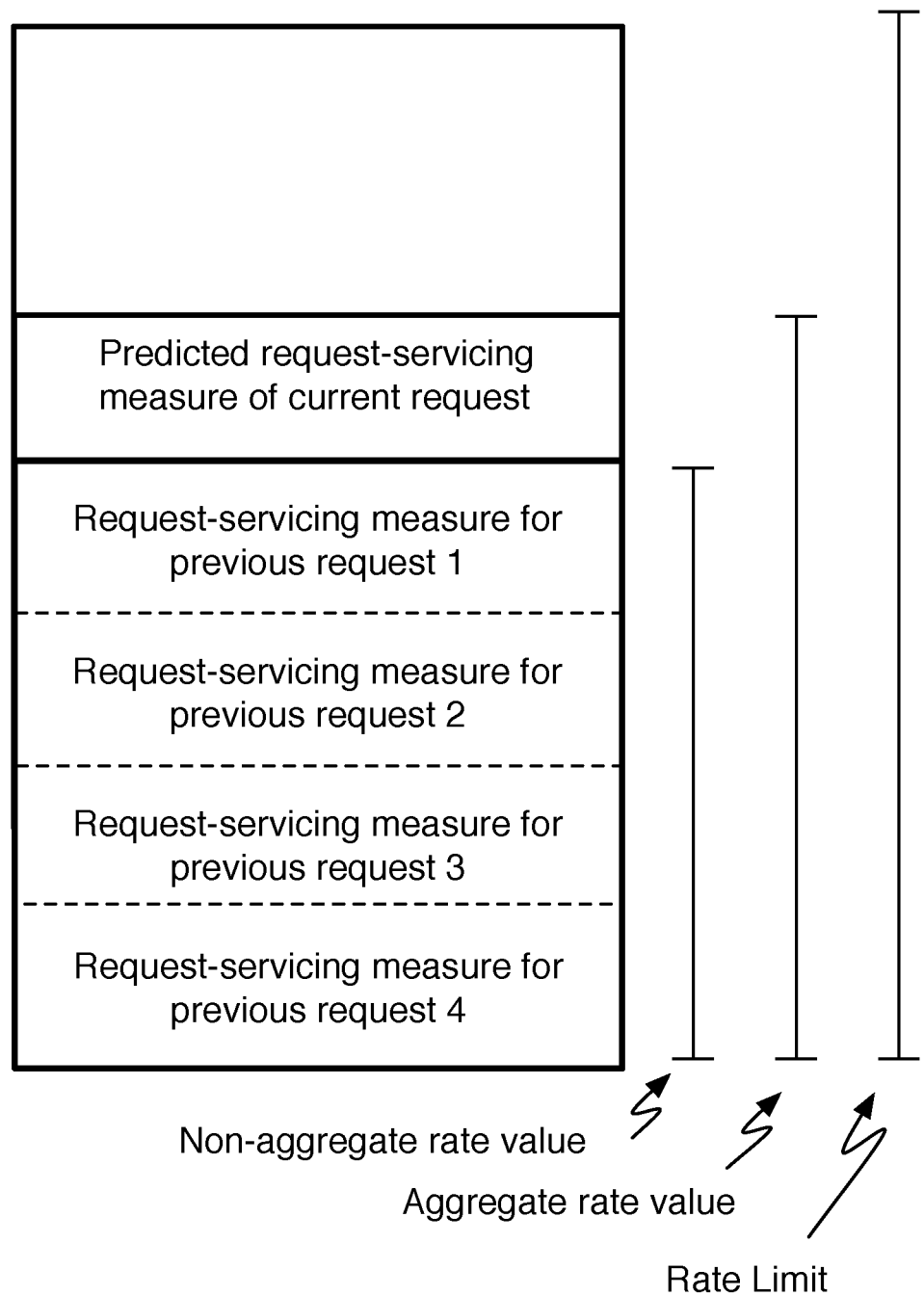
FIG. 8 is an exemplary graphic representation comparing types of rate values and rate limits.

The rate value is preferably accessed or calculated from records stored in a rate database (or databases). The rate value is preferably stored, maintained, and identified in the database by key values relating to the granularity/resolution of rate monitoring (e.g., globally, per account, per resource, per account usage of a resource, etc.), Preferably, the contents of a request are used in accessing values or data from which a rate value can be or has been calculated. The contents of a request preferably include a header, an authentication portion, and a body. The contents can preferably specify IP addresses, authentication parameters such as account secure identifiers and auth tokens (which can be used to identify accounts), data, URI's indicating targeted API resources, and/or any suitable data. In one variation, parameters from the contents of the request are used to access request-processing data/measurements in a database, and a rate value calculated. For example, after inspecting and identifying account information for who is making the request, the a concurrency value that indicated the number of active requests currently being processed can be obtained from a database by querying data for that account. A database may store a plurality of request history records from which a rate value is calculated. The request history preferably tracks the requests that are being processed but have not completed (i.e., actively processed requests). Preferably, the concurrency value computation can include either computing an absolute concurrency value, such as a number of account requests, or a relative concurrency value measuring a difference between a current value and a maximum value. The rate value may alternatively be stored or pre-calculated. Alternatively, retrieving a rate value can include calculating a rate value. Additionally, the rate value may be based on a request-servicing measure of previous requests. In other words, the rate value may reflect the value as it is before allowing the request to be processed. Alternatively, the rate value may be an aggregate value. In an aggregate value, the predicted/expected request-servicing measure (e.g., cost) that would be contributed by the single API request is added to the request-servicing measure of at least a sub-set of previous requests as shown in FIG. 8. The sub-set of previous requests preferably includes requests currently being processed, but may alternatively include requests in a time window or selected in any suitable manner.

An alternative or additional aspect of retrieving an API rate value, the rate value may be based at least in part on the available resources used to process requests. For example, the servers, the capacity of the media processors, data storage resources, and other resources used to service the API requests may impact the rate value (and/or optionally the rate limit). Such resources may additionally be measured based on classification of the API request. For example, the resources used to process one type of API request may be measured differently from resources dedicated to processing a second type of API.

Step S130, which includes determining a comparison status associated with a comparison of the API rate value to a rate limit, functions to compare the retrieved rate value to a threshold during a predetermined interval or window. Preferably, the rate value and the rate limit are maintained with the same association/granularity. That is to say, if the rate value is maintained for each account, the rate limit is similarly assigned for each account. The rate limit may alternatively be a default value, based on the resource type or classification, based on the account, or assigned in any suitable manner. The rate limit may additionally be dynamic. For example, the rate limit may adjust based on the current (e.g., real-time), recent, and/or past API usage. In another exemplary scenario, the rate limit may adjust based on the capacity of the API service resources. For example, if a cluster of services goes down, then the rate limit preferably is lowered to account for the change in processing capacity. In one preferred embodiment, the rate value and the rate limit are stored in a two-entry dataset. Alternatively, the request limiter can maintain a running and explicit count of requests for each user, which can either be maintained indefinitely or reset at predetermined intervals as described herein. As noted above, a suitable interval can be on the order of approximately six seconds, although any other interval or range of intervals is equally applicable to the preferred method.

Figure 9:
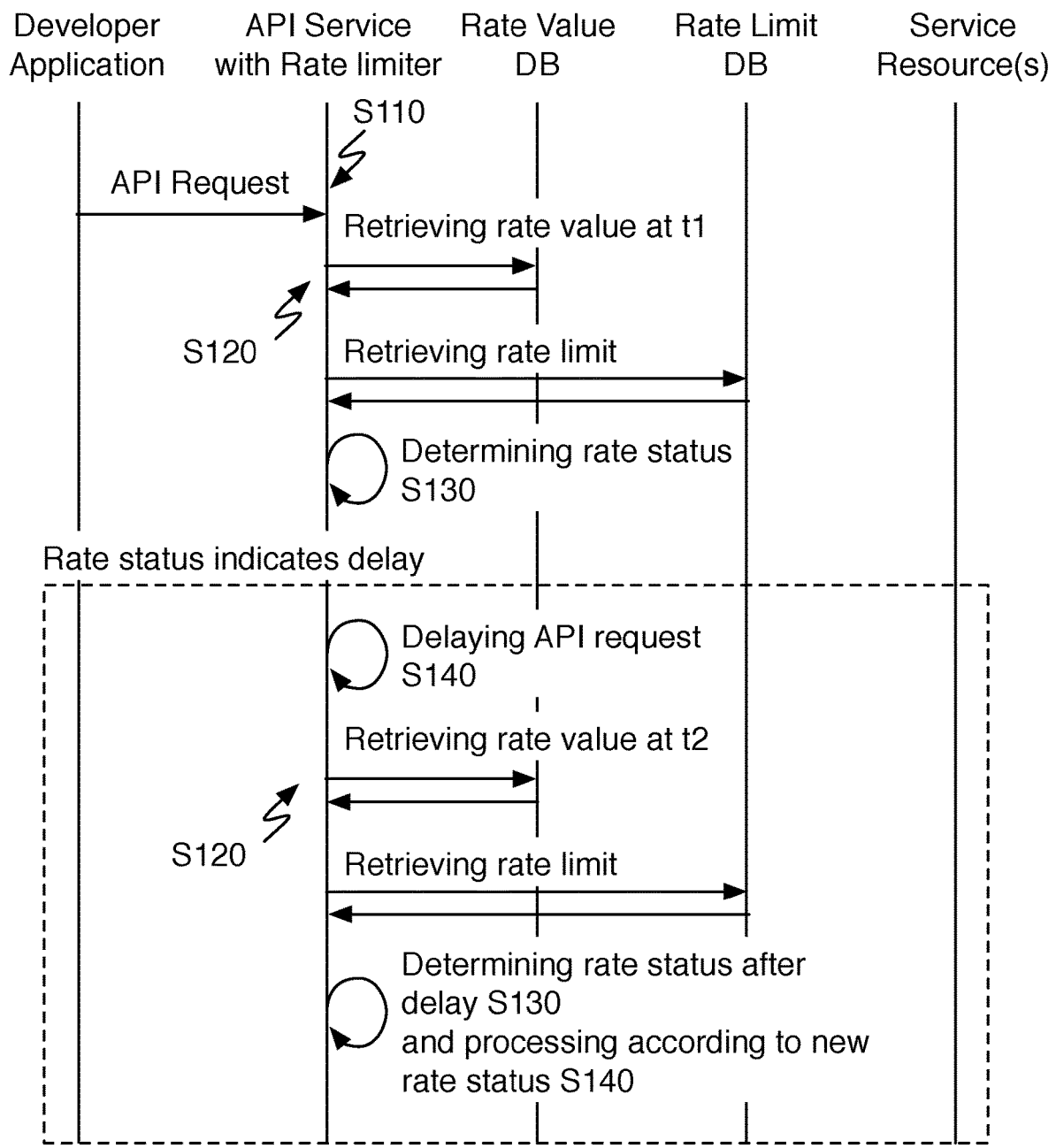
FIG. 9 is a communications schematic of a variation of a method of a preferred embodiment that includes processing a reaction for a delay comparison status.

The comparison status preferably corresponds to defined conditions and corresponding actions. The magnitude of the rate value is preferably compared to a rate limit, and the condition is based on the sign and/or magnitude of the relative values. In one variation, the comparison status is decided by determining whether the account has and/or is exceeding a concurrency limit. In one preferred embodiment, possible comparison statuses preferably include proceed, cancel, and/or delay conditions. The proceed comparison status preferably indicates that the API usage is within the limits and that the API request should be serviced normally. The cancel comparison status preferably indicates that the API usage is in violation of the API usage (e.g., rate value exceeds the rate limit, too many concurrent API requests, or too many requests made within a time window). API requests that receive a cancel status will preferably be dropped, canceled, sent an error message, or fail in any suitable manner. The delay comparison status preferably indicates that the API request can be processed at a later time. The delay comparison status may be used in addition or as an alternative to the cancel comparison status. The API request with a delay comparison status may be queued, added to a wait list, scheduled for subsequent processing, or managed in any suitable way such that the API request is not processed immediately. A delayed API request may be subsequently processed by the request limiter as shown in FIG. 9 (such that it may be delayed a plurality of times) or processed by an API service. A plurality of rate values and rate limits may additionally be used in determining a comparison status. For example, the rate values and various rate limits for different segments/granularity of API resource usage could be used for more complex conditional cases. For example, a comparison status may be dependent on the relative values of an account resource rate value, the account resource rate limit, the rate value for the whole system, and a global rate limit.

Figure 10:
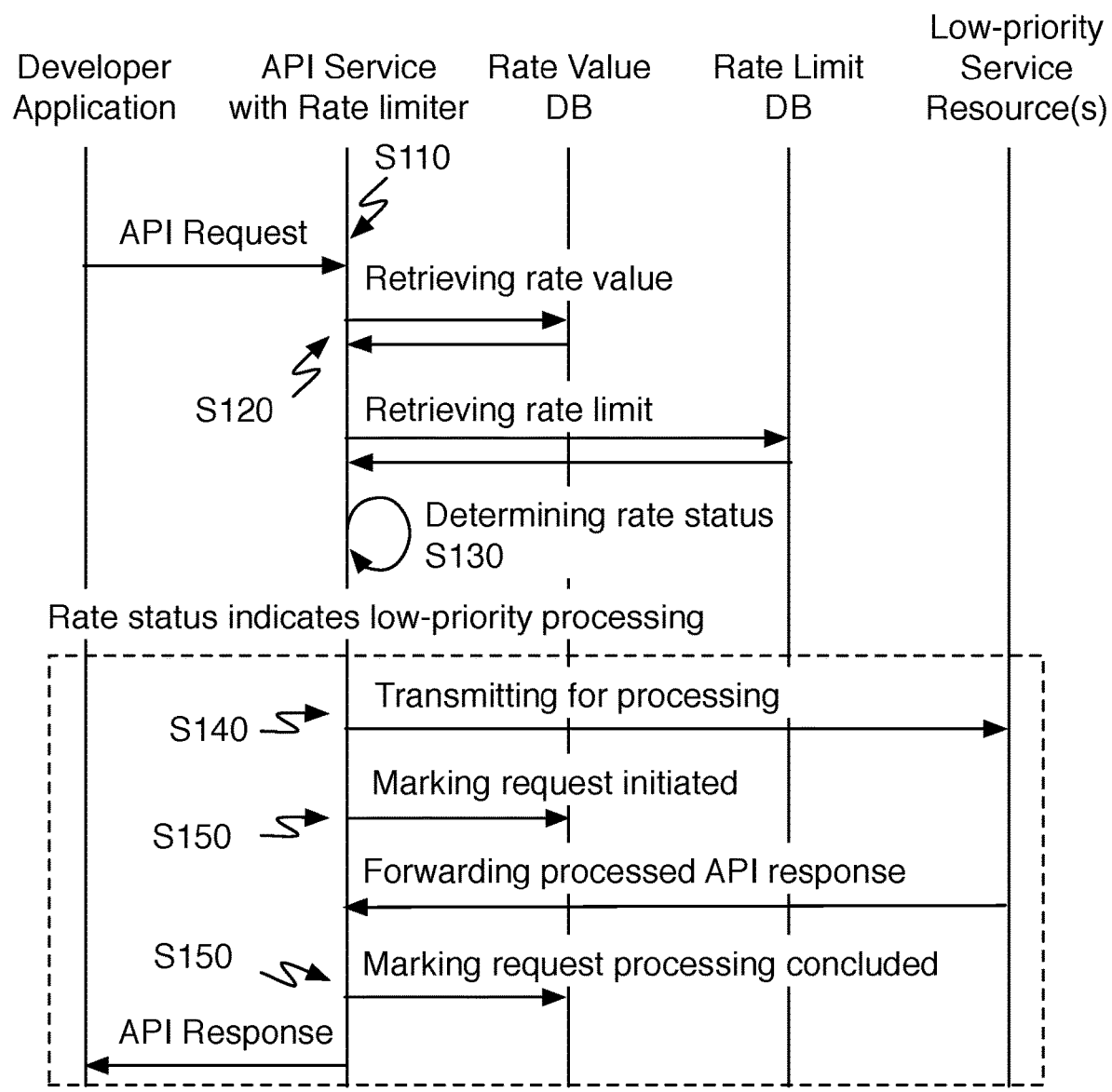
FIG. 10 is a communications schematic of a variation of a method of a preferred embodiment that includes transitioning traffic to a low-priority service resource.

Step S140, which includes processing a reaction to the API request according to the comparison status, functions to treat the API activity according to the comparison status. Processing a reaction preferably includes transmitting the API request to an API processing resource if the comparison is within the rate limit (i.e., a proceed comparison status). In other words, an API request is preferably processed normally if the activity is within normal operation limits. The API processing resource is preferably a service for processing the API request. The API processing resource may additionally or alternatively include a plurality of components. The API processing resource may be a server, a database, a media processor, and/or any suitable resource used in processing an API request. The API processing resources used by a given API request may be determined by the API resource, API method call, or other content of the API request. Processing a reaction can additionally include impeding processing of the API request if the comparison indicates the concurrency limit is not satisfied. Impeding processing may include, dropping the request, throwing an error message (and replying to API request with an error response), sending a notification, charging or billing at a different rate for the API request over the limit, deprioritizing the API request, processing the API request differently, delaying the API request or processing, or impeding the API request processing in any suitable manner. In one variation of the preferred method, impeding API request processing can include transitioning traffic of the high-usage accounts to low-priority service resources as shown in FIG. 10. The resources allocated to those accounts may be both data intensive and not particularly time sensitive as compared to the normal operations of the telephony platform. The low-priority service resources are preferably less crowded (and perhaps slower) data channels, but may be resources specialized for a particular task, resources with better or worse performance, or any suitable type of alternative processing resource. Additionally or alternatively, in response to excessive concurrent usage of the API by an account, impeding processing may include transmitting an error message to the account, slowing down requests from the account to the API, and/or sending other notifications and/or alerts to the account to inform the user of the excess and any action that the user might take to remedy its consumption. Processing a reaction can additionally or alternatively include delaying the API request if the comparison is a delay status. In some variations, an API request may be delayed as a form of impeding an API request. If an individual API request has been delayed over a set number of times, the API request may be delivered an error response or otherwise be dropped.

Step S150, which includes accounting for changes in the API usage rate, functions to measure, track, and record the API usage so that the API values are maintained. As mentioned above, the API usage is preferably accounted for based on accounts and/or API resource type, but may additionally or alternatively be tracked based on sub-accounts, endpoints, request properties, and/or any suitable parameter for tracking. In the variation where the method is applied to concurrency rate monitoring and regulating, the initiation and conclusion of API requests are accounted for such that a request limiter has access to information specifying the number of current/active API requests. Accounting for changes in the API usage rate are preferably triggered based on a conditional state. The conditional state is preferably based at least in part on the comparison status. Accounting for changes in the API usage rate preferably includes accounting for an increase in the API concurrency value if an API request is transmitted to a service for processing. In other words, when a service resource processing an API request or when the API request has been sent for processing, a record is generated to account for the in progress nature of the API request. In one variation, the request is logged with a start time, the account information, the API resource(s), and/or any suitable information that may facilitate tracking the API request. Accounting for changes in the API usage rate can additionally include accounting for a decrease in the API concurrency value when an API request is substantially completed. In one variation, the resource servicing the request will forward response data to the API service. The API service will preferably prompt or initiate accounting for the conclusion of that API request, and the API service will transmit an API response with the requested data or information. In a variation, where the rate value is API initiation rate, only the number of API requests made within a set time window may be tracked. The rate value may alternatively be tracked in any suitable manner. Additional conditions may additionally or alternatively be used in combination or separately from the comparison status conditions described above. For example, the condition may only be triggered for a random sampling of API requests or if the number of API requests is above a threshold or if the capacity of the API servicing infrastructure is within a particular threshold.

Figure 11:
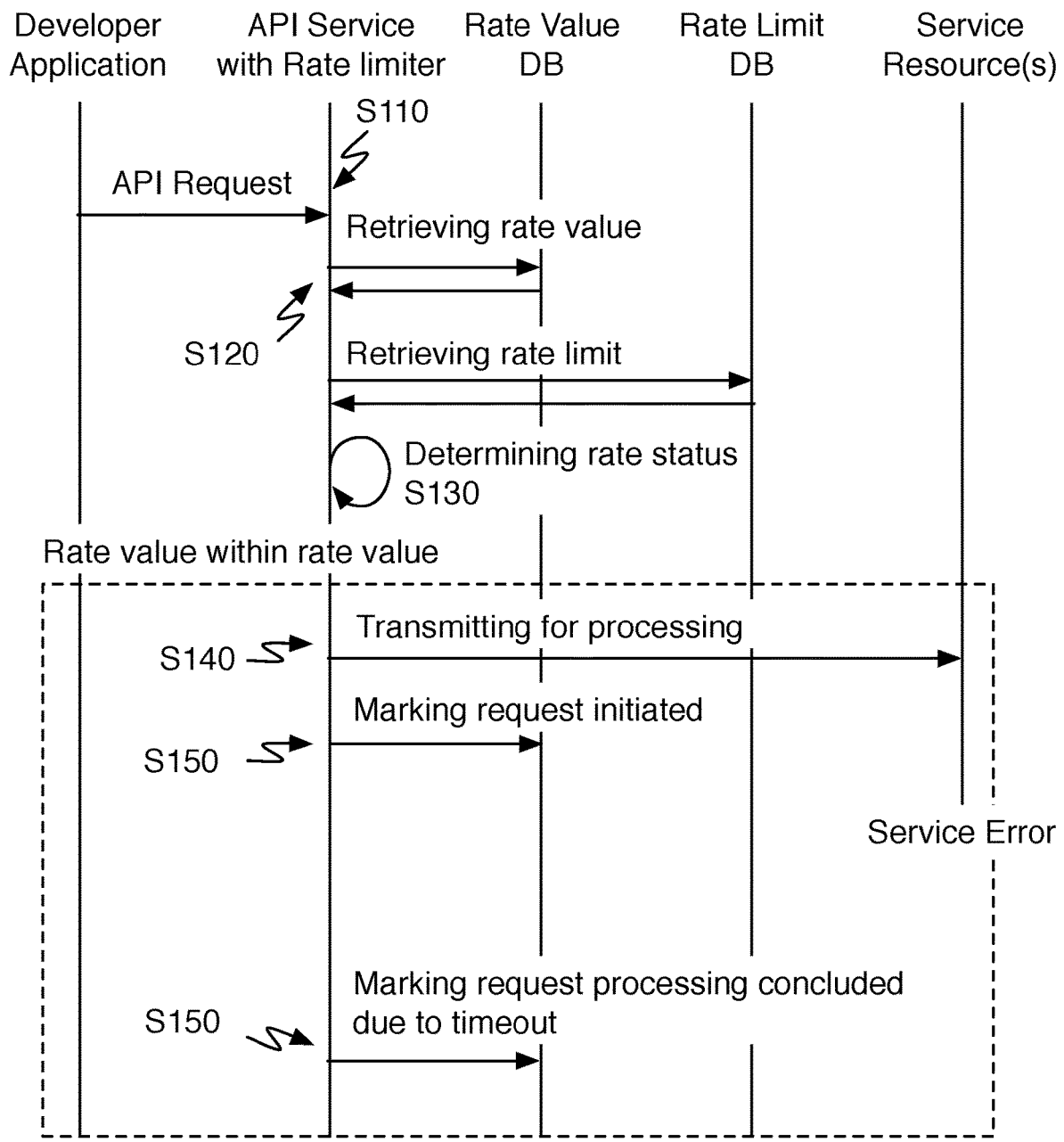
FIG. 11 is a communications schematic of a variation of a method of a preferred embodiment that includes accounting for an API request timeout.

Additionally, accounting for the termination of an API request may occur after a designated timeout. An API server and/or a service resource may fail resulting in an API request to have been initiated but never terminated. The request limiter preferably accounts for a predicted API request processing error by marking a record of the request as concluded, as shown in FIG. 11. The timeout preferably enables tracked API requests to be marked as terminated instead of, for example, remaining as a currently processing API request indefinitely. Preferably, the timeout interval can be any suitable length and can be related to the duration of the predetermined interval described above. More preferably, the time out interval is approximately the same duration as the predetermined interval described above, such that the concurrency values for each account being examined are being reset at approximately the same time as the request limiter is abandoning attempts to transmit any prior and outdated concurrence values to the API. Alternatively, the timeout interval duration can be any other suitable value, whether related or unrelated to any other timing mechanism described herein. Accordingly, each and every block in the preferred method can be performed in parallel by any suitable number of API services interacting with one or more request limiters.

As described above, a method of a preferred embodiment may be applied to a multitenant platform. In such an implementation, at least two accounts make a plurality of API requests. Each API request preferably has the comparison status checked, is processed according the comparison status, and the API request is tracked and monitored. In the variation where the rate value and/or rate limit is based on API concurrency of an account, an API request made by a first account preferably has a comparison status based on the API concurrency of that first account, and an API request made by a second account preferably has a comparison status based on the API concurrency of the second account. Multitenant API usage may additionally be segmented and monitored based on API resource type as described above. In the variation where the rate value and/or rate limit is based on API resource type concurrency of an accounts, an API request made by a first account preferably has a comparison status based on a concurrency value that indicates usage of the first API resource type by the first account, and an API request made by a second account preferably has a comparison status based on a concurrency value that indicates usage of the second API resource type by the second account.

In a preferred embodiment, the method is applied to a multitenant telecommunications API platform. A multitenant platform is preferably characterized by multiple entities (typically embodied through accounts or sub-accounts) accessing and using a service where the resources to support such usage is shared between the entities. The API requests are preferably rate monitored and regulated based on concurrency values and limits. The API requests can additionally be rate monitored and regulated based on account and API resource type. In one exemplary implementation, API requests to API resources for sending messages (e.g., SMS, MMS, or application messages), making outbound voice or video calls (e.g., PSTN, SIP, or video), accessing voice transcripts, accessing message transcripts, accessing video or audio recordings, accessing account information, altering in-session voice or video calls, and/or purchasing or provisioning endpoints (e.g., phone numbers, short codes, SIP addresses etc.) are individually tracked per account. The API resource types may alternatively be monitored in any suitable grouping or categorization of the above mentioned and/or alternative API resources.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the controller 16, the account database 18, the API cluster 20, any one or more API service 24, and/or the request limiter 22. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and various method processes.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    receiving, by an application programming interface (API) service, an API request initiated by a first user account, the API request directed to a first resource of the API service;
    determining a first concurrency limit allocated to the first user account for concurrent API requests directed to the first resource, the first concurrency limit indicating a threshold number of concurrent API requests that can be processed for the first user account; and
    performing a first action based on determining that a number of received concurrent API requests initiated by the first user account meets the first concurrency limit or performing a second action based on determining that the number of received concurrent API requested initiated does not meet the first concurrency limit.

2. The method of claim 1, wherein performing the first action comprises returning an error message to the first user account.

3. The method of claim 1, wherein the number of received concurrent API requests associated with the first user account is determined based on a subset of the received concurrent API requests associated with the first user account that were received during a first period of time.

4. The method of claim 1, wherein a second concurrency limit allocated to a second user account for concurrent API requests directed to the first resource is different than the first concurrency limit.

5. The method of claim 1, further comprising:
    receiving, a command to adjust a default concurrency limit allocated to the first user account for concurrent API requests directed to the first resource to the first concurrency limit; and
    adjusting a configuration associated with the first user account based on the command.

6. The method of claim 1, further comprising:
    receiving a second API request initiated by the first user account and directed to a second resource of the API service;
    determining a second concurrency limit allocated to the first user account for concurrent API requests directed to the second resource; and
    performing a second action based on a comparison of the second concurrency limit and a number of received concurrent API requests, initiated by the first user account, that are directed to the second resource.

7. The method of claim 1, further comprising:
    receiving a second concurrent API request associated with the first user account that is directed to the first resource of the API service; and
    performing a second action based on determining that the number of received concurrent API requests initiated by the first user account is below the first concurrency limit, the second action being different than the first action.

8. An application programming interface (API) service comprising:
    one or more computer processors; and
    one or more computer-readable mediums storing instructions that, when executed by the one or more computer processors, cause the API service to perform operations comprising:
    receiving an API request initiated by a first user account, the API request and directed to a first resource of the API service;
    determining a first concurrency limit allocated to the first user account for concurrent API requests directed to the first resource, the first concurrency limit indicating a threshold number of concurrent API requests that can be processed for the first user account; and
    performing a first action based on determining that a number of received concurrent API requests initiated by the first user account meets the first concurrency limit or performing a second action based on determining that the number of received concurrent API requested initiated does not meet the first concurrency limit.

9. The API service of claim 8, wherein performing the first action comprises returning an error message to the first user account.

10. The API service of claim 8, wherein the number of received concurrent API requests associated with the first user account is determined based on a subset of the received concurrent API requests associated with the first user account that were received during a first period of time.

11. The API service of claim 8, wherein a second concurrency limit allocated to a second user account for concurrent API requests directed to the first resource is different than the first concurrency limit.

12. The API service of claim 8, the operations further comprising:
    receiving a command to adjust a default concurrency limit allocated to the first user account for concurrent API requests directed to the first resource to the first concurrency limit; and
    adjusting a configuration associated with the first user account based on the command.

13. The API service of claim 8, the operations further comprising:
    receiving a second API request initiated by the first user account and directed to a second resource of the API service;
    determining a second concurrency limit allocated to the first user account for concurrent API requests directed to the second resource; and
    performing a second action based on a comparison of the second concurrency limit and a number of received concurrent API requests, initiated by the first user account, that are directed to the second resource.

14. The API service of claim 8, the operations further comprising:
    receiving a second concurrent API request associated with the first user account that is directed to the first resource of the API service; and
    performing a second action based on determining that the number of received concurrent API requests initiated by the first user account is below the first concurrency limit, the second action being different than the first action.

15. A non-transitory computer-readable medium storing instructions that, when executed by one or more computer processors of an application programming interface (API) service, cause the API service to perform operations comprising:
    receiving an API request initiated by a first user account, the API request and directed to a first resource of the API service;
    determining a first concurrency limit allocated to the first user account for concurrent API requests directed to the first resource, the first concurrency limit indicating a threshold number of concurrent API requests that can be processed for the first user account; and performing a first action based on determining that a number of received concurrent API requests initiated by the first user account meets the first concurrency limit or performing a second action based on determining that the number of received concurrent API requested initiated does not meet the first concurrency limit.

16. The non-transitory computer-readable medium of claim 15, wherein performing the first action comprises returning an error message to the first user account.

17. The non-transitory computer-readable medium of claim 15, wherein the number of received concurrent API requests associated with the first user account is determined based on a subset of the received concurrent API requests associated with the first user account that were received during a first period of time.

18. The non-transitory computer-readable medium of claim 15, wherein a second concurrency limit allocated to a second user account for concurrent API requests directed to the first resource is different than the first concurrency limit.

19. The non-transitory computer-readable medium of claim 15, the operations further comprising:
receiving a command to adjust a default concurrency limit allocated to the first user account for concurrent API requests directed to the first resource to the first concurrency limit; and
adjusting a configuration associated with the first user account based on the command.

20. The non-transitory computer-readable medium of claim 15, the operations further comprising:
receiving a second concurrent API request associated with the first user account and directed to a second resource of the API service;
determining a second concurrency limit allocated to the first user account for concurrent API requests directed to the second resource; and
performing a second action based on a comparison of the second concurrency limit and a number of received concurrent API requests initiated by the first user account that are directed to the second resource.

* * * * *